United States Patent

Kelley

(10) Patent No.: US 8,465,607 B1
(45) Date of Patent: Jun. 18, 2013

(54) HIGHER-PERFORMANCE SOLID-ROCKET PROPELLANTS AND METHODS OF UTILIZING THEM

(75) Inventor: John M. Kelley, Owings Mills, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1221 days.

(21) Appl. No.: 12/284,476

(22) Filed: Sep. 18, 2008

(51) Int. Cl.
| C06B 27/00 | (2006.01) |
| F02G 1/00 | (2006.01) |
| F02G 3/00 | (2006.01) |
| F02K 9/68 | (2006.01) |
| F02K 9/00 | (2006.01) |
| B63H 11/00 | (2006.01) |
| B64G 1/40 | (2006.01) |
| B64G 99/00 | (2006.01) |
| F03G 7/00 | (2006.01) |

(52) U.S. Cl.
USPC ............... 149/87; 60/200.1; 60/201; 60/204; 60/253; 60/721

(58) Field of Classification Search
USPC ............... 149/87; 60/200.1, 201, 204, 253, 60/721
See application file for complete search history.

(56) References Cited

U.S. PATENT DOCUMENTS

| 2,500,117 | A | * | 3/1950 | Chandler | 60/201 |
| 2,920,443 | A | * | 1/1960 | Higginson | 60/253 |
| 3,008,417 | A | * | 11/1961 | Keathley et al. | 102/287 |
| 3,407,736 | A | * | 10/1968 | Beuschel | 102/291 |
| 3,547,030 | A | * | 12/1970 | Pinsky et al. | 102/376 |
| 5,008,306 | A | | 4/1991 | Goguelin | |
| 5,190,094 | A | | 3/1993 | Knoess | |
| 2004/0226638 | A1 | | 11/2004 | Posson | |
| 2006/0142468 | A1 | | 6/2006 | Downing, Jr. et al. | |

* cited by examiner

*Primary Examiner* — James McDonough
(74) *Attorney, Agent, or Firm* — Fredric J. Zimmerman

(57) ABSTRACT

A method, and a related material, for utilizing high performance solid rocket propellants, which are molding powders. A propellant molding powder are selected to have a design burning rate and a tailored compaction profile. A morphology of a center-port of a rocket is selected for the design burn rate and a spin-rate. The molding powder is compacted isostatically around a core through application of triaxial pressure therein forming a solid rocket propellant charge with the selected center-port shape. The solid rocket propellant charge is placed in a cartridge or a case. The cartridge is selected from various types of cartridges and specialty charges. The solid rocket propellant molding powders are highly filled with metallic fuels, and have a binder in the range of 4% to 18%, which at least partially coats the surface of the molding powder.

20 Claims, 3 Drawing Sheets

HIGHER-PERFORMANCE SOLID-ROCKET PROPELLANTS AND METHODS OF UTILIZING THEM

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The present invention relates generally to solid rocket propellants, and in particular to higher-performance solid-rocket propellants and methods of utilizing them.

2. Description of the Related Art

High performance is a relative term, as one of the highest performing extruded propellant in use is HEN-12, which substantially is a cartridge-loaded solid-propellant charge extruded from bulk thermoplastic double-base (DB; gelatinized, polymeric nitrocellulose-nitroglycerin) composition. For propellants of this class, the binder volume-fraction ($\Phi_b$) approaches 100% binder, as the propellant is also the binder. Achievement of yet higher-performing propellant requires filling the composition (i.e.; replacing a proportion of the polymeric propellant volume) with selected solid fillers (e.g.; metallic fuels, oxidizers, nitramines and the like), thereby yielding a class of propellants categorized as "composite-modified double-base" (CMDB). For several reasons, CMDB compositions having a high solids volume-fraction ($\Phi_s$) are problematic to extrude. The disclosed invention teaches compositions and methods for utilizing these higher-performing compositions.

CMDB compositions are employed when more energy is needed for a finite volume, either to achieve higher rocket velocities or to deliver larger ammunition payloads. The energy, or more precisely, the energy density is defined as the Figure of Merit (FM), where FM is the impulse per unit mass times the density, which is equivalent to the impulse per volume. The impulse is the integral of the force times time or the derivative of momentum with respect to time. As stated in the previous paragraph, in order to achieve propellants having a higher Figure of Merit requires filling the composition with metallic fuels, oxidizers, nitramines, and the like, and these modified propellants are problematic if extruded. The filled composition typically has a significantly higher viscosity, and if it can be extruded, the propellant usually exhibits phase-separation and/or knit-lines that poorly re-join and re-knit. Phase-separation and/or knit-lines are evidence of anisotropic or orthotropic orientation, which can lead to disastrous consequences when the rocket is launched. The CMDB compositions are typically cast, but there are problems with casting, as a thermosetting binder or the like has to be added back into the composition. Another processing method is die compaction using a die press, but again there is anisotropic or orthotropic orientation, versus the desirable isotropic orientation.

What is needed is a higher-performing propellant, which can be formed into high L/D ratio rocket motors, where the resulting motor is a nearly isotropic material (e.g. substantially free of anisotropic and orthotropic orientation).

SUMMARY OF THE INVENTION

The invention is a solid rocket propellant material, where the propellant material is a metallic fuel filled propellant that is a moulding powder having from about 4 percent to about 18 percent by volume of a binder, where a surface of the moulding powder has a coating of the binder. An example of a metallic fuel is aluminum.

The invention further includes a method for utilizing a high performance solid rocket propellant The method includes: selecting a first solid rocket propellant moulding powder having a first tailored burning rate; selecting a tailored compaction profile for the propellant moulding powder; selecting an a center-port shape, where the center-port shape influences a propellant's burn rate and a spin-rate for the rocket; compacting isostatically the first solid rocket propellant moulding powder around a core through the application of triaxial pressure therein forming a solid rocket propellant charge having a center-port with the selected shape. The center-port shape is substantially a mirror image of a surface of the core. Prior to placing in a cartridge or other case, the core is generally removed, as potentially it can be reused.

The solid rocket propellant charge is suitable for both case-bonded and cartridge-loaded applications. Compaction is generally performed on a mandrel, therein producing the center-port. The center-port shape reflects the shape of the mandrel and/or the core, and the shape determines the surface to volume relationship, and therefore influences both how fast the propellant burns and the tangential velocity component produced by the combustion gasses as they exit the rocket. A cylindrical mandrel is used to create a cylindrical bore, and if more surface area and a faster burn are needed then a star shaped mandrel can optionally be selected. Rifling can be imparted to the bore to enhance the spin rate, adding a stabilizing torque to the rocket. The gaseous combustion products exiting a rocket motor with a "twisted" or "rifled" star-configuration will have a tangential velocity component, and apply a controlled stabilizing torque to the entire rocket for a specified time to achieve a required spin-rate, and then cease, after which the motor may or may not continue to deliver thrust.

In general, as compaction around mandrels is possible, complex port geometries are feasible, less tooling is required, and more-advanced energy-management methods are at hand. Moreover, the invention allows ballistic performance options that are not feasible with the state of the art technology typical of rocket-type ammunition. Energy-density is high and systems tailorable. As previously discussed the moulded powder propellant technology enables the composition to be selected as to a desired energy density, without the process limitations of extruded or die pressed propellants. The force and length of time of isostatic compaction will influence how the solid rocket propellant charge burns, and the rocket motor is not limited to a single type of charge.

BRIEF DESCRIPTION OF THE DRAWINGS

The foregoing invention will become readily apparent by referring to the following detailed description and the appended drawings in which.

DETAILED DESCRIPTION OF EXEMPLAY EMBODIMENTS OF THE INVENTION

Figure 1B:
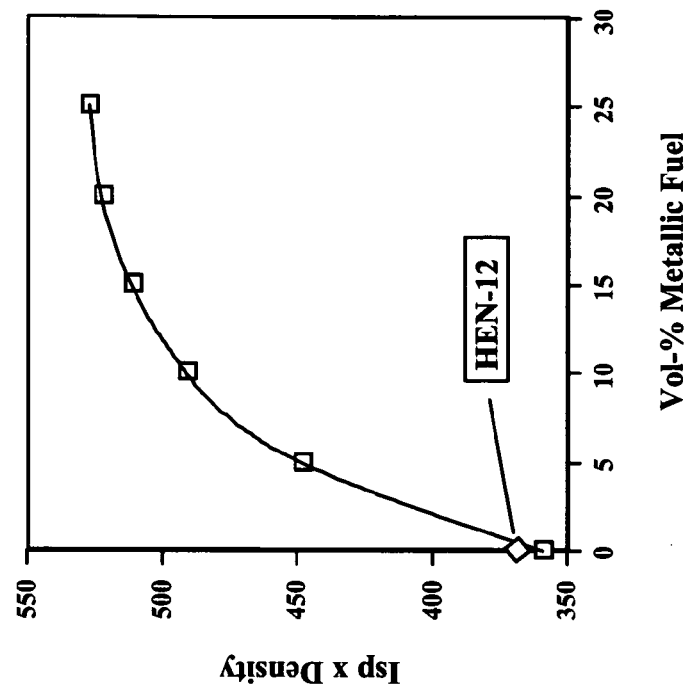
FIG. 1b is a graph of the energy density per volume versus the percent by volume of aluminum.
Figure 1A:
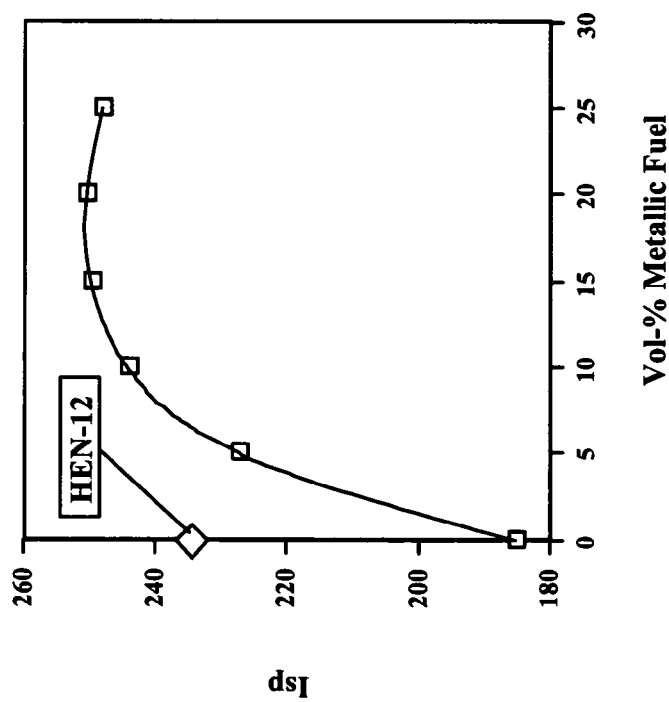
FIG. 1a is a graph of the energy density per mass versus the percent by volume of aluminum.

The invention is a solid rocket propellant material including a metallic fuel filled propellant, which is a moulding powder having from about 4% to about 18% by volume of a binder, where a surface of the moulding powder includes a coating of the binder. FIG. 1a and FIG. 1b graphically illustrate the thermochemical performances (mass- and volume-based energy-densities; $I_{sp}$ and $\rho \times I_{sp}$, respectively) of a propellant composition designated PBPW-7 (II). In the example, ammonium perchlorate (AP) and aluminum (Al) are admixed with a fluoroelastomer, Dupont's Viton™ "A" binder, at 10.0% volume. Performance is shown as a function of the metallic fuel (Al). Aluminum is parametrically substituted over the range of 0.0-25.0 volume-percent for equal volumes of the oxidizer (AP). The balance of the composition is comprised of 1,3,5-trinitro-1,3,5-triazine (RDX) and 1,3,5-triamino-2,4,6-trinitrobenzene (TATB). The binder level is at a median value. Similar compositions incorporating lesser and greater volumes of binder level are feasible. These compositions would include "families" of curves, the performance of which would vary with the binder-type and its volume percent. A workable binder volume range is from about 4% to about 18%. For comparison, the mass- and volume-based energy densities of HEN-12 also are shown on the Y-axis (i.e.; HEN-12 contains no Al). Recall HEN-12 is gelatinized, polymeric nitrocellulose-nitroglycerin) composition. As can be seen the addition of a metallic fuel increases the energy density per unit mass of propellant from 235 Ns/g to about 255 Ns/g (an increase of about 8.5%), but on a volume basis the increase is about 40% (from about 370 Ns/ml to about 530 Ns/ml). The energy density volumetrically is much higher with the metallic fuel.

The solid rocket propellant material may also be a highly solids-loaded solid-fueled ramjet material, where the metallic fuel of choice, in an exemplary embodiment, is boron.

At these high filler levels, ~25% by volume, the propellant cannot be extruded, and die pressing produces an anisotropic or orthotropic orientation. Isostatic compaction produces a solid rocket propellant charge having a center-port, wherein the charge is nearly an isotropic material.

The solid rocket propellant material may further include oxidizers, nitramines, and similar materials. A downside is that while nitramines increase the energy density, nitramines also make the composition more shock sensitive.

The binder is selected from the group of fluoroelastomers, polyoelfins, thermoplastic elastomers, fluoroolefins, polyisobutylenes, and polyisobutylene derivatives. An exemplary example of a polyisobutylene derivative is hydroxylated polyisobutylene, sometimes known as R-45 HT. Fluoroelastomers, are a class of synthetic rubber which provide extraordinary levels of resistance to chemicals, oil and heat, while providing useful service life above 200° C. The outstanding heat stability and excellent oil resistance of these materials are due to the high ratio of fluorine to hydrogen, the strength of the carbon-fluorine bond, and the absence of unsaturation.

Figure 4:
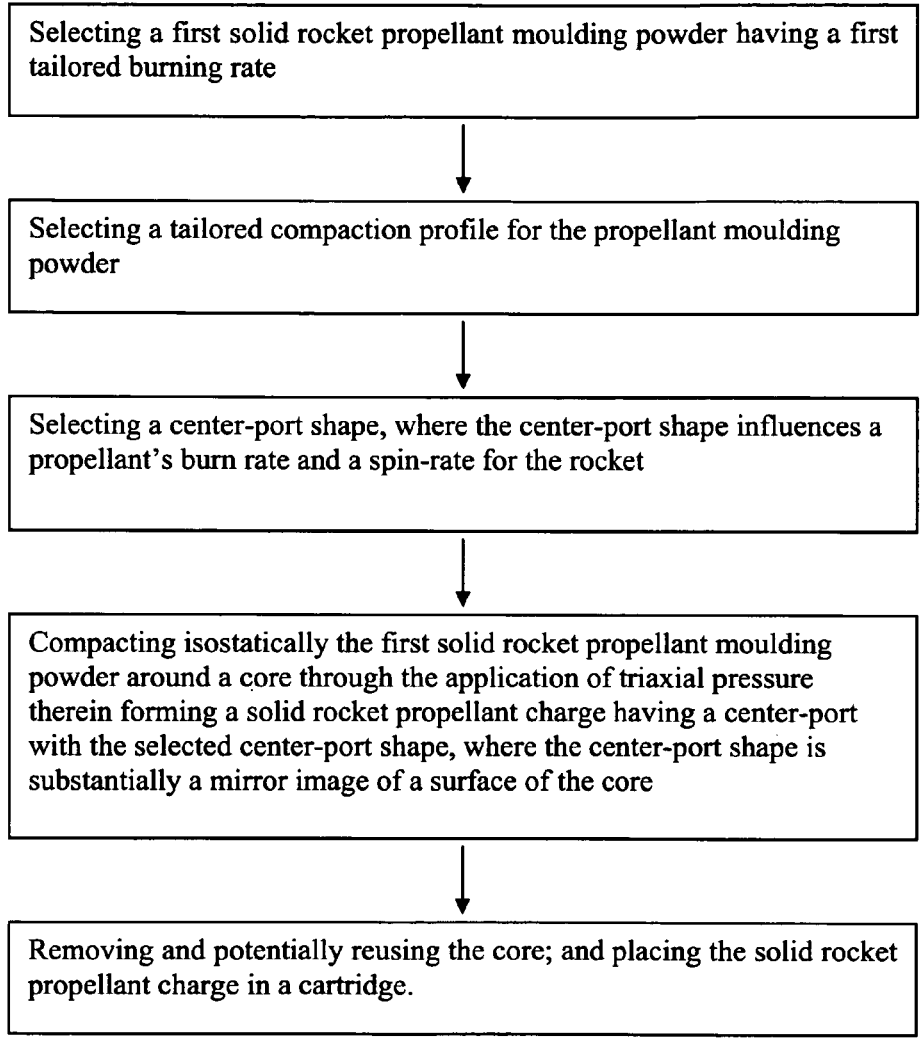
FIG. 4 is a flow diagram of the invented method.

Referring to FIG. 4, the invention is also a method for utilizing the high performance solid rocket propellant. The method includes: selecting a first solid rocket propellant moulding powder having a first tailored burning rate; selecting a tailored compaction profile for the propellant moulding powder; selecting a center-port shape, where the center-port shape influences a propellant's burn rate and a spin-rate for the rocket; compacting isostatically the first solid rocket propellant moulding powder around a core through the application of triaxial pressure therein forming a solid rocket propellant charge having a center-port with the selected shape, where the center-port shape is substantially a mirror image of a surface of the core; and removing and potentially reusing the core. The solid rocket propellant charge is placed in a cartridge or another type of case. The cartridge is selected from the group consisting of aircraft stores eject cartridges, solid rocket cartridges, and specialty charges.

The method may further include selecting a second (and higher) solid rocket propellant moulding powder having a second tailored burning rate; and compacting isostatically the second solid rocket propellant moulding powder, such that the second solid rocket propellant is concentrically-layered, axially-positioned in tandem, or otherwise to produce a boost-sustain burn profile.

The method may further includes selecting an inhibiting material; and compacting isostatically the inhibiting material on areas to prevent them from burning.

Figure 2:
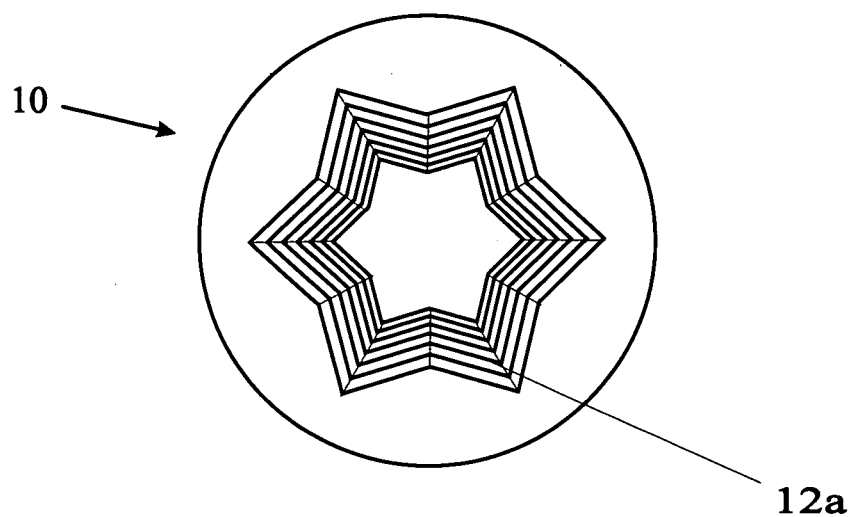
FIG. 2 is an end-on view of a star shaped center-port.

FIG. 2 is an end-on view of a solid rocket propellant charge 10 including a center-port 12, where the center-port 12 is a star 12a. A clover leaf center-port is not illustrated, but is another variant of a higher surface area shape.

Figure 3:
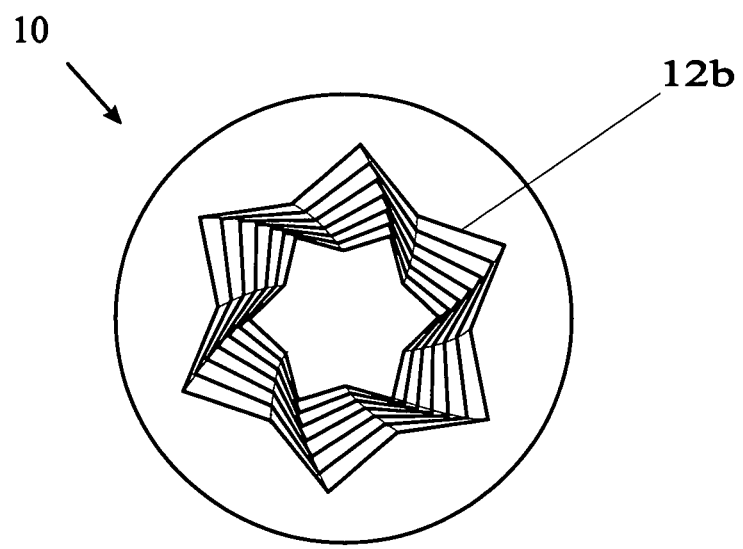
FIG. 3 is an end-on view of a twisted star shaped center-port.

FIG. 3 is an end-on view of a solid rocket propellant charge 10 having a center-port 12, where the center-port 12 is a twisted star 12b. The "twist" imparts a tangential velocity component to the combustion gases, and applies a controlled stabilizing torque to the entire rocket for a specified time to achieve a required spin-rate.

An example of utilizing the process follows. The solid rocket propellant moulding powder is isostatically compacted with an isostatic press to form a solid rocket propellant charge utilizing a conformal bladder, such as a rubber cylinder having at least one open end, and a rigid, precisely-dimensioned, preferably re-usable metal core. After compaction, the core can be removed, and the resulting propellant charge has a net-formed center-port bore which is precisely-dimensioned. The pressurized conformal bladder on the other hand does not confer precise dimensions to the outer envelope of the propellant charge, and the resulting charge normally has a slight curvilinear shape such as an "hourglass" or a "banana" geometry. In the exemplary method, the bladder is filled with the moulding powder, and evacuated during and, in an exemplary embodiment, prior to compaction. Evacuation prior to compaction is effected using a round plate seated proximate to the open end of the cylindrical bladder seated on the moulding powder. The round plate includes a port that is in gaseous communication with the interior of the bladder and an evacuation system. The isostatic press includes a heated jacket with a thermal convection medium to heat and/or to cool the contents of the press. Water is a good convection medium, as it can be used to either heat or cool the press, depending on the temperature of the water. The powder filled bladder is immersed in the press in a hydraulic fluid, the lid is closed, and the pressure of the hydraulic fluid is raised. A pressure of around 30 Kpsi has been found to effect sufficient compaction for many molding powders. After the moulding powder has fused, the pressure is returned to ambient, the lid is opened, the bladder and propellant charge are removed, and evacuation is ceased, in the appropriate order. The hour glass and/or banana asymmetry in the compacted propellant charge imparted by the compression process is then corrected to the desired geometry using explosive-machining. The ends of the rigid core, used as a mandrel, may be employed as true centers about which the compacted propellant charge may be revolved to machine on a lathe the outer envelope to the required geometry and dimensions. Furthermore, the core is facile for performing other turning processes, such as tape-winding or otherwise applying an incombustible material (i.e.; an inhibitor) in order to control the motor's interior ballistics via the as-designed surface-to-volume relationship of the propellant charge (i.e.; as dictated by the bore surface-history, or surface-area vs. distance burned). In a variation on the method, the compaction may be performed iteratively producing intermediate (circumferential) explosive-machining steps between successive compactions. Alternatively, axial compositional arrangements as well as radial compaction are also possible, for instance to afford aerostability advantages (e.g.; alteration of the centroid of mass with respect to the centroid of pressure as the total propellant charge is consumed).

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A solid rocket propellant material, comprising: a metallic fuel filled propellant that is a moulding powder including from about 4 percent to about 18 percent by volume of a binder,
   wherein the moulding powder comprises a surface, said surface includes a coating of the binder, wherein a center port, which includes a twisted geometric shape, is surrounded by the moulding powder where said twisted geometric shape influences a spin-rate for a rocket.

2. The solid rocket propellant material according to claim 1, wherein the metallic fuel filled propellant is filled with aluminum.

3. The solid rocket propellant material according to claim 2, further comprising at least one of oxidizers and nitramines.

4. The solid rocket propellant material according to claim 2, wherein the metallic fuel filled propellant is filled with substantially an equal volume of an oxidizer.

5. The solid rocket propellant material according to claim 1, further comprising an oxidizer,
   wherein the oxidizer is ammonium perchlorate.

6. The solid rocket propellant material according to claim 1, wherein the binder is selected from the group consisting of fluoroelastomers, polyoelfins, thermoplastic elastomers, fluoroolefins, polyisobutylenes, and polyisobutylene derivatives.

7. The solid rocket propellant material according to claim 1, wherein the metallic fuel comprises up to 25% by volume of the propellant material.

8. The solid rocket propellant material according to claim 1, wherein the energy density by volume is greater than 370 Ns/ml.

9. The solid rocket propellant material according to claim 1, wherein the solid rocket propellant material is a solid-fueled ramjet highly solids-loaded, where the metallic fuel is boron.

10. A method for utilizing a high performance solid rocket propellant, comprising:
    selecting a first solid rocket propellant moulding powder having a first tailored burning rate;
    selecting a tailored compaction profile for the propellant moulding powder;
    selecting a center-port shape,
        wherein the center-port shape influences a propellant's burn rate and a spin-rate for the rocket;
    compacting isostatically the first solid rocket propellant moulding powder around a core through the application of triaxial pressure therein forming a solid rocket propellant charge having a center-port with a selected said center-port shape,
        wherein the center-port shape is substantially a mirror image of a surface of said core; and
    removing and reusing said core.

11. The method according to claim 10, wherein said center-port includes a star shaped geometry.

12. The method according to claim 10, wherein said center-port includes a twisted star shaped geometry, and
    wherein said twisted star shaped geometry imparts a tangential velocity component to gaseous combustion products formed during burning, which cause the rocket to spin, therein stabilizing the rocket.

13. The method according to claim 10, further comprising selecting a second solid rocket propellant moulding powder including a second tailored burning rate; and
    compacting isostatically the second solid rocket propellant moulding powder,
        wherein the second solid rocket propellant is concentrically-layered and axially-positioned in tandem to produce a boost-sustain burn profile.

14. The method according to claim 10, wherein said center-port is rifled.

15. The method according to claim 10, further comprising machining the propellant charge to predetermined dimensions; and
    correcting any asymmetry being produced by isostatic compaction,
        wherein said core is a mandrel core situated on a lathe to turn the propellant charge.

16. The method according to claim 10, further comprising selecting an inhibiting material; and
    compacting isostatically the inhibiting material on areas for preventing said areas from burning.

17. A method for utilizing a high performance solid rocket propellant, comprising:
    selecting a first solid rocket propellant moulding powder including a first tailored burning rate;
    selecting a tailored compaction profile for the propellant moulding powder;
    selecting a center-port shape,
        wherein the center-port shape influences a propellant's burn rate and a spin-rate for the rocket;
    compacting isostatically the first solid rocket propellant moulding powder around a core through an application of triaxial pressure therein forming a solid rocket propellant charge comprising a center-port with the selected center-port shape,
    wherein the center-port shape is substantially a mirror image of a surface of said core;
    removing and potentially reusing said core; and
    placing the solid rocket propellant charge in a cartridge.

18. The method according to claim 17, further comprising selecting a second solid rocket propellant moulding powder including a second tailored burning rate; and
    compacting isostatically the second solid rocket propellant moulding powder,
        wherein the second solid rocket propellant is concentrically-layered, axially-positioned in tandem to produce a boost-sustain burn profile.

19. The method according to claim 17, wherein said center-port is rifled.

20. The method according to claim 17, wherein cartridge is selected from one of the group consisting of aircraft stores eject cartridges, solid rocket cartridges, and specialty charges.

\* \* \* \* \*